United States Patent
Khlat et al.

(10) Patent No.: US 8,102,943 B1
(45) Date of Patent: Jan. 24, 2012

(54) VARIABLE DIGITAL VERY LOW INTERMEDIATE FREQUENCY RECEIVER SYSTEM

(75) Inventors: Nadim Khlat, Midi-Pyrenees (FR); Alexander Wayne Hietala, Phoenix, AZ (US)

(73) Assignee: RF Micro Devices, Inc., Greensboro, NC (US)

( * ) Notice: Subject to any disclaimer, the term of this patent is extended or adjusted under 35 U.S.C. 154(b) by 1033 days.

(21) Appl. No.: 11/740,036

(22) Filed: Apr. 25, 2007

Related U.S. Application Data

(60) Provisional application No. 60/798,577, filed on May 8, 2006.

(51) Int. Cl.
   H04L 27/00 (2006.01)
   H03K 9/00 (2006.01)
(52) U.S. Cl. ........................................ 375/316; 375/344
(58) Field of Classification Search .................... 375/316
   See application file for complete search history.

(56) References Cited

U.S. PATENT DOCUMENTS

| | | | | |
|---|---|---|---|---|
| 5,802,463 A | * | 9/1998 | Zuckerman | 455/208 |
| 2006/0094391 A1 | * | 5/2006 | Darabi | 455/323 |
| 2006/0116085 A1 | * | 6/2006 | Borremans et al. | 455/91 |
| 2007/0190958 A1 | * | 8/2007 | Darabi | 455/285 |

* cited by examiner

*Primary Examiner* — David C. Payne
*Assistant Examiner* — Erin File
(74) *Attorney, Agent, or Firm* — Withrow & Terranova, P.L.L.C.

(57) ABSTRACT

The present invention is a radio frequency (RF) receiver that uses an RF mixer for tuning to desired frequency bands. The RF receiver down converts a received RF signal into a very low intermediate frequency (VLIF) signal. When receiving a desired RF signal, the frequency of the resulting VLIF signal is called the desired VLIF frequency, and is based on the signal strength of the received RF signal. In one embodiment of the present invention, the desired VLIF frequency is selected to be one of two VLIF frequencies, and is inversely related to the signal strength of the received RF signal. For example, a higher desired VLIF frequency is selected when receiving lower signal strength RF signals to increase effective receiver sensitivity. A lower desired VLIF frequency is selected when receiving higher signal strength RF signals to improve image rejection.

20 Claims, 6 Drawing Sheets

VARIABLE DIGITAL VERY LOW INTERMEDIATE FREQUENCY RECEIVER SYSTEM

RELATED APPLICATIONS

This application claims the benefit of provisional patent application Ser. No. 60/798,577, filed May 8, 2006, the disclosure of which is hereby incorporated by reference in its entirety.

FIELD OF THE INVENTION

The present invention relates to radio frequency (RF) receivers used in RF communications systems.

BACKGROUND OF THE INVENTION

Many RF communications systems have RF receivers that need to receive a desired RF signal on a specific RF channel, which is a desired RF channel that has a desired bandwidth and a desired RF center frequency. One function of the RF receiver is to reject any RF signals at frequencies other than those within the desired bandwidth of the desired RF channel; therefore, numerous filtering and signal rejection techniques have been developed to achieve this function. One such technique is called super-heterodyning, in which received RF signals are filtered and then mixed with a local oscillator signal to down convert the filtered RF signals into lower frequency signals, which are known as intermediate frequency (IF) signals. The mixing down converts a desired RF signal into a desired IF signal having a desired IF center frequency. Generally, it is easier to filter out unwanted signals that are close in frequency to desired signals at IF frequencies than it is to filter the same signals at higher RF frequencies. However, mixers have a characteristic that produces image signals in addition to desired signals. Image signals may be removed by RF filtering, IF filtering, or both.

In any heterodyne receiver, when a received RF input signal $F_R$ mixes with a local oscillator signal $F_{LO}$, the mixer produces an output signal with sums and differences of $F_R$ and $F_{LO}$. Specifically, the frequencies of $F_R-F_{LO}$ and $F_R+F_{LO}$, or $F_{LO}-F_R$ and $F_R+F_{LO}$, are the dominant mixer output frequency combinations. If $F_{LO}$ is chosen with a lower frequency than a desired RF input signal $F_{DRF}$, then an $F_R-F_{LO}$ portion of the mixer output signal produces a desired IF signal $F_{DIF}$; however, the mixer output signal will also include an $F_R+F_{LO}$ image signal, which is close to double the frequency of $F_{DRF}$ and easily removed by IF filtering. If a blocking image signal $F_{BIS}$ with a frequency located at a frequency of $F_{LO}$ minus the frequency of $F_{DIF}$ is received, the $F_R-F_{LO}$ portion of the mixer output will produce an image that is identical in frequency to $F_{DIF}$ but phase-shifted 180 degrees from $F_{DIF}$, and cannot be removed with normal IF filtering techniques; therefore, if upstream RF bandpass filtering cannot remove the blocking image signal, then other techniques must be used to remove the signal. However, since the blocking signal is phase-shifted by 180 degrees from $F_{DIF}$, a quadrature receiver architecture can be used to filter out the blocking image signal. A quadrature receiver architecture uses two mixers receiving the same RF input signal, which is mixed with two different local oscillator signals that are equal in frequency and phase-shifted from each other by 90 degrees. Complex filtering methods can then be used to filter out the blocking image signal. Any mismatch between the processing of in-phase signals and quadrature-phase signals will result in degradation of the rejection of image signals.

For example, if the desired RF input signal $F_{DRF}$ is at 900 Mhz and the local oscillator signal $F_{LO}$ is at 899 Mhz, then the desired IF signal $F_{DIF}$ is at 1 Mhz ($F_R-F_{LO}$). Further, an IF image signal is at 1799 Mhz ($F_R+F_{LO}$), which is easily filtered out in the IF section. A blocking image signal $F_{BIS}$ at 898 Mhz will produce a blocking IF signal at −1 Mhz ($F_R-F_{LO}$), which is phase-shifted 180 degrees from $F_{DIF}$. If the blocking image signal $F_{BIS}$ cannot be filtered out in the RF section, then complex filtering methods can be used to filter out the blocking image signal in the IF section.

Some RF communications protocols include as many channels as possible in a given bandwidth; therefore, channel spacing may be tight. As a result, desired IF center frequencies may be reduced to maximize adjacent channel and alternate channel rejection. Some communications systems use very low intermediate frequencies (VLIF) or even down convert such that the desired IF center frequency is zero, which is known as a direct conversion receiver (DCR); however, lower IF center frequencies tend to produce certain side effects. With a DCR, 1/f noise increases, direct current (DC) offsets, and second-order inter-modulation (IIP2) effects may be difficult to remove. As a result, effective receiver sensitivity may be reduced. The optimum desired IF center frequency may vary depending on the signal strengths of desired channels, adjacent channels, and alternate channels.

In some networks, there is a loose correlation between the signal strength of a desired signal and the signal strength of interfering image signals; therefore, when the signal strength of a desired signal is small, a higher desired VLIF frequency is desirable to increase receiver sensitivity. The resulting reduced image rejection is acceptable, since the signal strengths of interfering image signals are also small. Likewise, when signal strengths of interfering image signals are large, a lower desired VLIF frequency is desirable to increase image rejection. The resulting reduced receiver sensitivity is acceptable, since the signal strength of the desired signal is also large; therefore, in some networks, it would be beneficial to have an inverse correlation of the desired VLIF center frequency with signal strength.

Given the above factors, there is a need for an RF receiver that can change its desired IF center frequency based on signal strengths of received signals. Additionally, there is a need for a quadrature RF receiver with complex filtering having matched circuitry processing the in-phase signals and the quadrature-phase signals to eliminate blocking image signals that cannot be filtered out in the RF section of the quadrature RF receiver.

SUMMARY OF THE INVENTION

The present invention is an RF receiver that uses an RF mixer for tuning to desired frequency bands. The RF receiver down converts a received RF signal into a VLIF signal. When receiving a desired RF signal, the frequency of the resulting VLIF signal is called the desired VLIF frequency, and is based on the signal strength of the received RF signal. In one embodiment of the present invention, the desired VLIF frequency is selected to be one of two VLIF frequencies. The desired VLIF frequency is inversely related to the signal strength of the received RF signal. For example, a higher desired VLIF frequency is selected when receiving lower signal strength RF signals to increase effective receiver sensitivity. The higher VLIF frequency reduces de-sensitization due to 1/f noise, DC offsets, inter-modulation effects, or any combination thereof. A lower desired VLIF frequency is selected when receiving higher signal strength RF signals to improve image rejection. The lower VLIF frequency improves rejection of blocking image signals by moving the VLIF frequency of the blocking image signal away from the desired VLIF frequency, which allows IF filtering of some of the blocking image signal.

Certain embodiments of the present invention may use a quadrature RF mixer and quadrature polyphase filters to reject image interfering signals. Certain embodiments of the present invention may use quadrature gain correction circuitry, quadrature phase correction circuitry, or both to match the circuitry processing the in-phase signals and the quadrature-phase signals to improve image rejection. Certain embodiments of the present invention may convert the quadrature receiver signals into digital signals using analog-to-digital (A-to-D) conversion. Digital circuitry may provide polyphase filtering, down conversion, gain correction, phase correction, processing, or any combination thereof.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention is a radio frequency (RF) receiver that uses an RF mixer for tuning to desired frequency bands. The RF receiver down converts a received RF signal into a very low intermediate frequency (VLIF) signal. When receiving a desired RF signal, the frequency of the resulting VLIF signal is called the desired VLIF frequency, and is based on the signal strength of the received RF signal. In one embodiment of the present invention, the desired VLIF frequency is selected to be one of two VLIF frequencies. The desired VLIF frequency is inversely related to the signal strength of the received RF signal. For example, a higher desired VLIF frequency is selected when receiving lower signal strength RF signals to increase effective receiver sensitivity. The higher VLIF frequency reduces de-sensitization due to 1/f noise, DC offsets, inter-modulation effects, or any combination thereof. A lower desired VLIF frequency is selected when receiving higher signal strength RF signals to improve image rejection. The lower VLIF frequency improves rejection of blocking image signals by moving the VLIF frequency of the blocking image signal away from the desired VLIF frequency, which allows intermediate frequency (IF) filtering of some of the blocking image signal.

Certain embodiments of the present invention may use a quadrature RF mixer and quadrature polyphase filters to reject image interfering signals. Certain embodiments of the present invention may use quadrature gain correction circuitry, quadrature phase correction circuitry, or both to match the circuitry processing the in-phase signals and the quadrature-phase signals to improve image rejection. Certain embodiments of the present invention may convert the quadrature receiver signals into digital signals using analog-to-digital (A-to-D) conversion. Digital circuitry may provide polyphase filtering, down conversion, gain correction, phase correction, processing, or any combination thereof.

Figure 1:
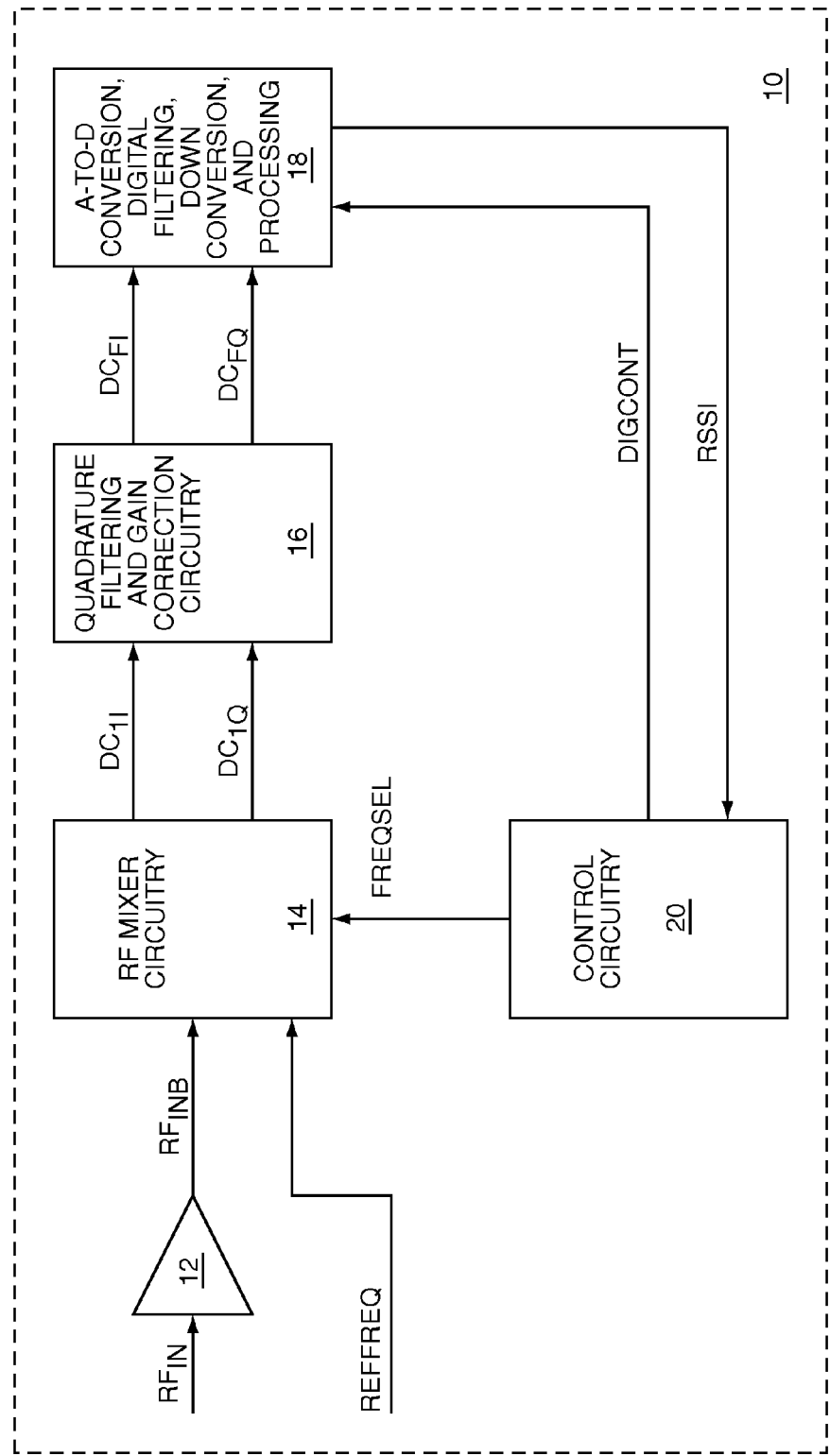
FIG. 1 shows one embodiment of the present invention used in a quadrature RF receiver.

FIG. 1 shows one embodiment of the present invention used in a quadrature RF receiver 10. An RF input signal $RF_{IN}$ is received by an RF amplifier 12, which buffers the RF input signal $RF_{IN}$ to create a buffered RF input signal $RF_{INB}$. RF mixer circuitry 14 receives and splits the buffered RF input signal $RF_{INB}$ into two signals, which are mixed with quadrature local oscillator signals to create a first in-phase down converted output signal $DC_{1I}$ and a first quadrature-phase down converted output signal $DC_{1Q}$. The RF mixer circuitry 14 includes a frequency synthesizer to create the quadrature local oscillator signals using a reference frequency signal REFFREQ. The RF mixer circuitry 14 receives a frequency select signal FREQSEL to select the frequency of the quadrature local oscillator signals.

The frequency of the quadrature local oscillator signals is selected to be either higher or lower than the frequency of a desired RF input signal $RF_{IN}$ such that the first down converted output signals $DC_{1I}$, $DC_{1Q}$ are VLIF signals with a desired VLIF frequency. The desired VLIF frequency is inversely related to the signal strength of the RF input signal $RF_{IN}$, and may be one of two VLIF frequencies; therefore, the frequency of the quadrature local oscillator signals is selected to provide the desired VLIF frequency. In an exemplary embodiment of the present invention, when the signal strength of the RF input signal $RF_{IN}$ is strong, the desired VLIF frequency is approximately 120 kilohertz (khz), and when the signal strength of the RF input signal $RF_{IN}$ is weak, the desired VLIF frequency is approximately 175 khz. Alternate embodiments of the present invention may use any number of desired IF frequencies, which may or may not include 120 khz, 175 khz, or both.

The RF mixer circuitry 14 feeds the first down converted output signals $DC_{1I}$, $DC_{1Q}$ into quadrature filtering and gain correction circuitry 16, which filters out unwanted signals and matches the in-phase signals and the quadrature-phase signals to create a filtered in-phase down converted output signal $DC_{FI}$ and a filtered quadrature-phase down converted output signal $DC_{FQ}$. The quadrature filtering and gain correction circuitry 16 feeds the filtered down converted output signals $DC_{FI}$, $DC_{FQ}$ into A-to-D conversion, digital filtering, down conversion, and processing circuitry 18, which converts the filtered down converted output signals $DC_{FI}$, $DC_{FQ}$ from analog signals into digital signals. The digital signals are digitally filtered to remove adjacent channels, images, and any other interfering signals. Any needed down conversion, de-modulation, or signal processing is performed on the digital signals. Signal strengths of desired and interfering signals may be measured and provided in an RF signal strength signal RSSI. Any required mode or control information is received from a digital control signal DIGCONT. Control circuitry 20 receives the RF signal strength signal RSSI, and then chooses the appropriate frequency of the quadrature local oscillator signals based on the RF signal strength signal RSSI. The control circuitry 20 provides the frequency select signal FREQSEL and the digital control signal DIGCONT with the proper information.

Figure 2:
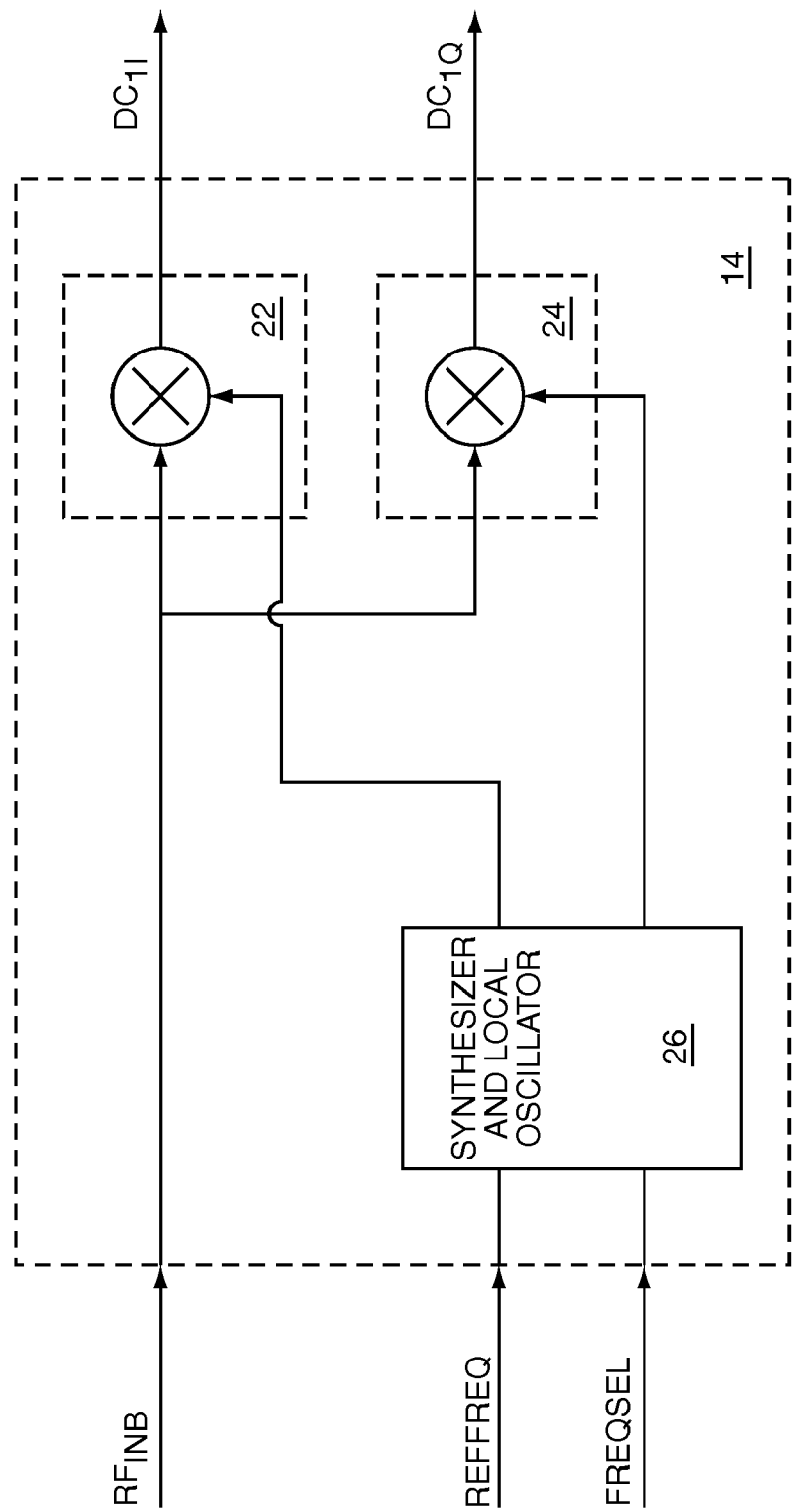
FIG. 2 shows details of the RF mixer circuitry of FIG. 1.

FIG. 2 shows details of the RF mixer circuitry 14 of FIG. 1. An in-phase mixer 22 and a quadrature-phase mixer 24 receive the buffered RF input signal $RF_{INB}$. A synthesizer and local oscillator 26 receives the reference frequency signal REFFREQ to support synthesis of any needed local oscillator frequency, and the frequency select signal FREQSEL to select the frequency of the quadrature local oscillator signals. The synthesizer and local oscillator 26 provides an in-phase local oscillator signal to the in-phase mixer 22, and a quadrature-phase local oscillator signal to the quadrature-phase mixer 24. The in-phase and quadrature-phase local oscillator signals are approximately equal in amplitude and phase-shifted approximately 90 degrees from each other. The mixers 22, 24 mix the local oscillator signals with the buffered RF input signal $RF_{INB}$ to create the first down converted output signals $DC_{1I}$, $DC_{1Q}$.

Figure 3:
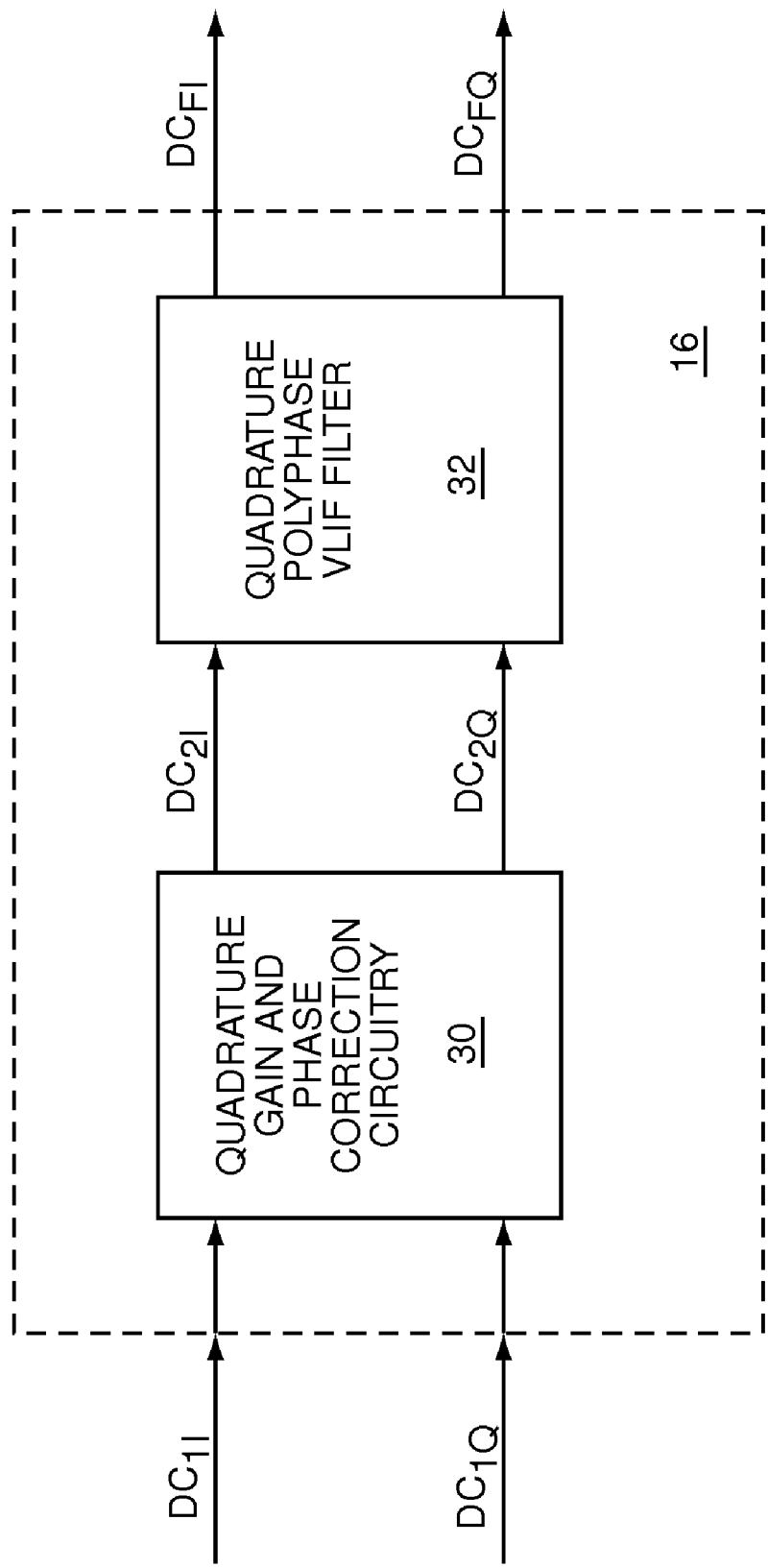
FIG. 3 shows details of the quadrature filtering and gain correction circuitry of FIG. 1.

FIG. 3 shows details of the quadrature filtering and gain correction circuitry 16 of FIG. 1. The first down converted output signals $DC_{1I}$, $DC_{1Q}$ feed quadrature gain and phase correction circuitry 30, which applies gain and phase correction factors to the first down converted output signals $DC_{1I}$, $DC_{1Q}$ to create a second in-phase down converted output signal $DC_{2I}$ and a second quadrature-phase down converted output signal $DC_{2Q}$. The second down converted output signals $DC_{2I}$, $DC_{2Q}$ are approximately equal in amplitude and phase-shifted 90 degrees from each other, which provides optimal downstream complex filtering. The second down converted output signals $DC_{2I}$, $DC_{2Q}$ feed a quadrature polyphase VLIF filter 32, which provides additional filtering of VLIF image signals to create the filtered down converted output signals $DC_{FI}$, $DC_{FQ}$. Alternate embodiments of the present invention may include gain correction circuitry, phase correction circuitry, or both, in the synthesizer and local oscillator 26, in the mixers 22, 24, downstream of the mixers 22, 24, or any combination thereof.

Figure 4:
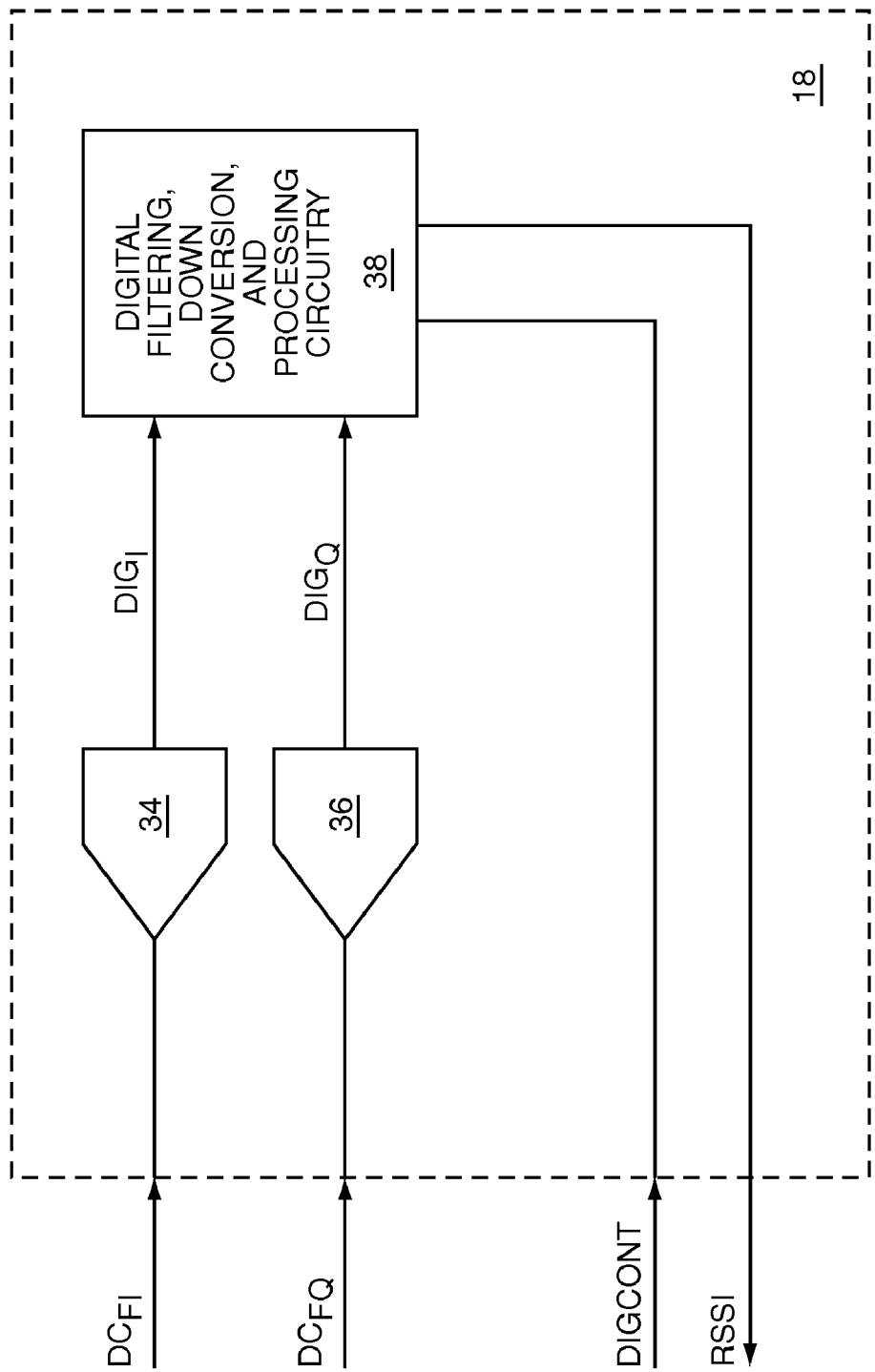
FIG. 4 shows details of the A-to-D conversion, digital filtering, down conversion, and processing circuitry of FIG. 1.

FIG. 4 shows details of the A-to-D conversion, digital filtering, down conversion, and processing circuitry 18 of FIG. 1. The filtered down converted output signals $DC_{FI}$, $DC_{FQ}$ feed an in-phase A-to-D converter 34 and a quadrature-phase A-to-D converter 36, which convert the analog signals $DC_{FI}$, $DC_{FQ}$ into a digital in-phase down converted output signal $DIG_I$ and a digital quadrature-phase down converted output signal $DIG_Q$. The A-to-D converters 34, 36 feed the digital down converted output signals $DIG_I$, $DIG_Q$ into digital filtering, down conversion, and processing circuitry 38. The digital signals $DIG_I$, $DIG_Q$ are digitally filtered to remove adjacent channels, images, and any other remaining interfering signals. Any needed down conversion, de-modulation, or signal processing is performed on the digital signals. Signal strengths of desired and interfering signals may be measured and provided in the RF signal strength signal RSSI. Any required mode or control information is received from the digital control signal DIGCONT. Other embodiments of the present invention may eliminate all or part of the quadrature filtering and gain correction circuitry 16; however, since all filtering and image rejection would need to be handled by the digital filtering, down conversion, and processing circuitry 38, A-to-D converters 34, 36 with larger dynamic ranges may be required.

In an exemplary embodiment of the present invention, the quadrature RF receiver 10 uses one of two desired VLIF frequencies, which are approximately 120 khz and 175 khz. An alternate channel blocker may present an interfering RF signal at approximately 400 khz from a desired RF signal. Other interfering systems may have an interfering RF signal at approximately 600 khz from the desired RF signal. The A-to-D converters 34, 36 may have a dynamic range of approximately 85 decibels (db) to handle the dynamic range of desired signals and remaining interfering signals. Without a quadrature polyphase VLIF filter 32, the dynamic range of the A-to-D converters 34, 36 would have to handle the full dynamic ranges of interfering image signals, which may be approximately 95 db for the 400 khz interfering signal and 104 db for the 600 khz interfering signal. Such wide dynamic ranges would increase the cost, complexity, and current consumption of the A-to-D converters 34, 36; therefore, the quadrature polyphase VLIF filter 32 reduces interfering image signals sufficiently to be handled by the A-to-D converters 34, 36 with a dynamic range of approximately 85 db.

Figure 5:
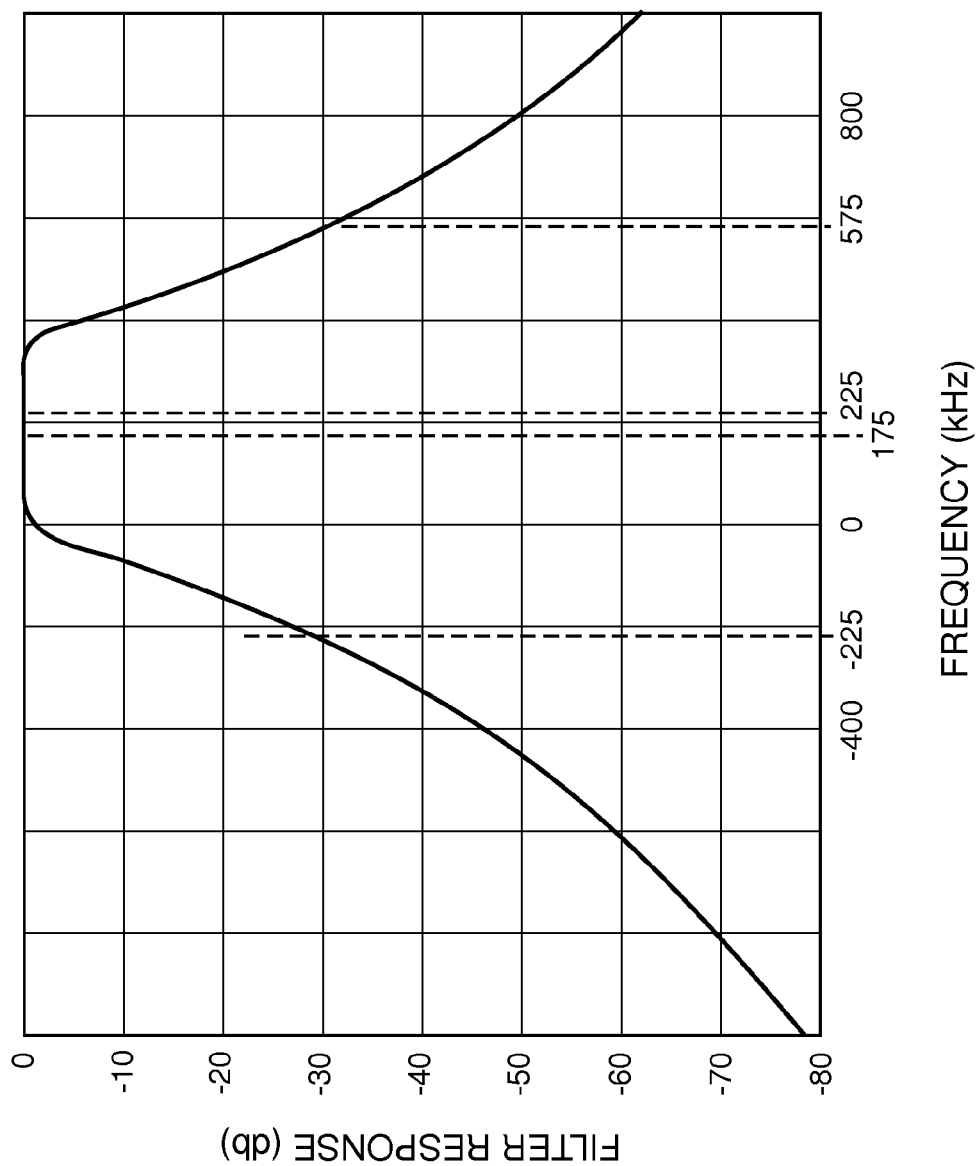
FIG. 5 shows a graph of the frequency response of a 5-pole polyphase bandpass filter having a VLIF center frequency at 175 kilohertz.

FIG. 5 shows a graph of the frequency response of a 5-pole polyphase bandpass filter having a VLIF center frequency at 175 khz. 400 khz alternate channel blockers would produce images at 575 khz (175+400 khz) and −225 khz (175−400 khz). From FIG. 5, the polyphase bandpass filter would attenuate these images by about 30 db; however, the frequency response curve illustrated in FIG. 5 assumes a perfect amplitude match and a perfect 90 degree phase-shift between the in-phase side and the quadrature-phase side of the polyphase bandpass filter. Any imbalances between the two sides degrade the ability of the polyphase bandpass filter to distinguish between −225 khz and +225 khz. Since +225 khz is separated from 175 khz by only 50 khz, any +225 khz signals are in the passband of the polyphase bandpass filter, and must be handled by downstream circuitry; therefore, closely matched quadrature circuitry may be required. Alternatively, a 5-pole polyphase bandpass filter having a VLIF center frequency at 120 khz could be used. 400 khz alternate channel blockers would produce images at 520 khz (120+400 khz) and -280 khz (120−400 khz). Quadrature imbalances may produce a positive image at +280 khz, which is separated from 120 khz by 160 khz and easier to filter out than a signal with only 50 khz of separation. Therefore, use of a 120 khz VLIF center frequency may reduce or eliminate the need for additional quadrature balancing circuitry.

In an exemplary embodiment of the present invention, a 400 khz alternate channel blocker may be 41 db stronger than a desired RF signal when the signal strength of the desired RF signal is greater than −83 decibel milliwatt (dbm). If the desired RF signal strength is less than or equal to −83 dbm, then no alternate channel blocker is specified. The −83 dbm threshold may be reduced another 10 db to −93 dbm due to power control requirements. Use of a 175 khz VLIF center frequency when the desired RF signal strength is less than or equal to −93 dbm reduces receiver de-sensitization due to 1/f noise, DC offsets, or inter-modulation effects; however, image rejection is reduced, which is acceptable since no alternate channel blockers are specified. The increased receiver sensitivity is needed since the signal strength is lower. Switching to a 120 khz VLIF center frequency when the desired RF signal strength is greater than −93 dbm improves image rejection, which may be needed since alternate channel blockers may be present. The reduced receiver sensitivity is acceptable since the signal strength is higher.

Alternate embodiments of the present invention may use different signal strength thresholds, or may use multiple desired VLIF frequencies selected using multiple signal strength thresholds. One embodiment of the present invention may use a continuously variable desired VLIF frequency based on signal strength. Certain embodiments of the present invention may select the frequency of the quadrature local oscillator signals to be either higher or lower than the frequency of the desired RF input signal $RF_{IN}$ during the VLIF mode of operation. The selection may be based upon which frequency reduces the magnitude of interfering signals, as indicated by the signal strength of the RF input signal $RF_{IN}$.

Figure 6:
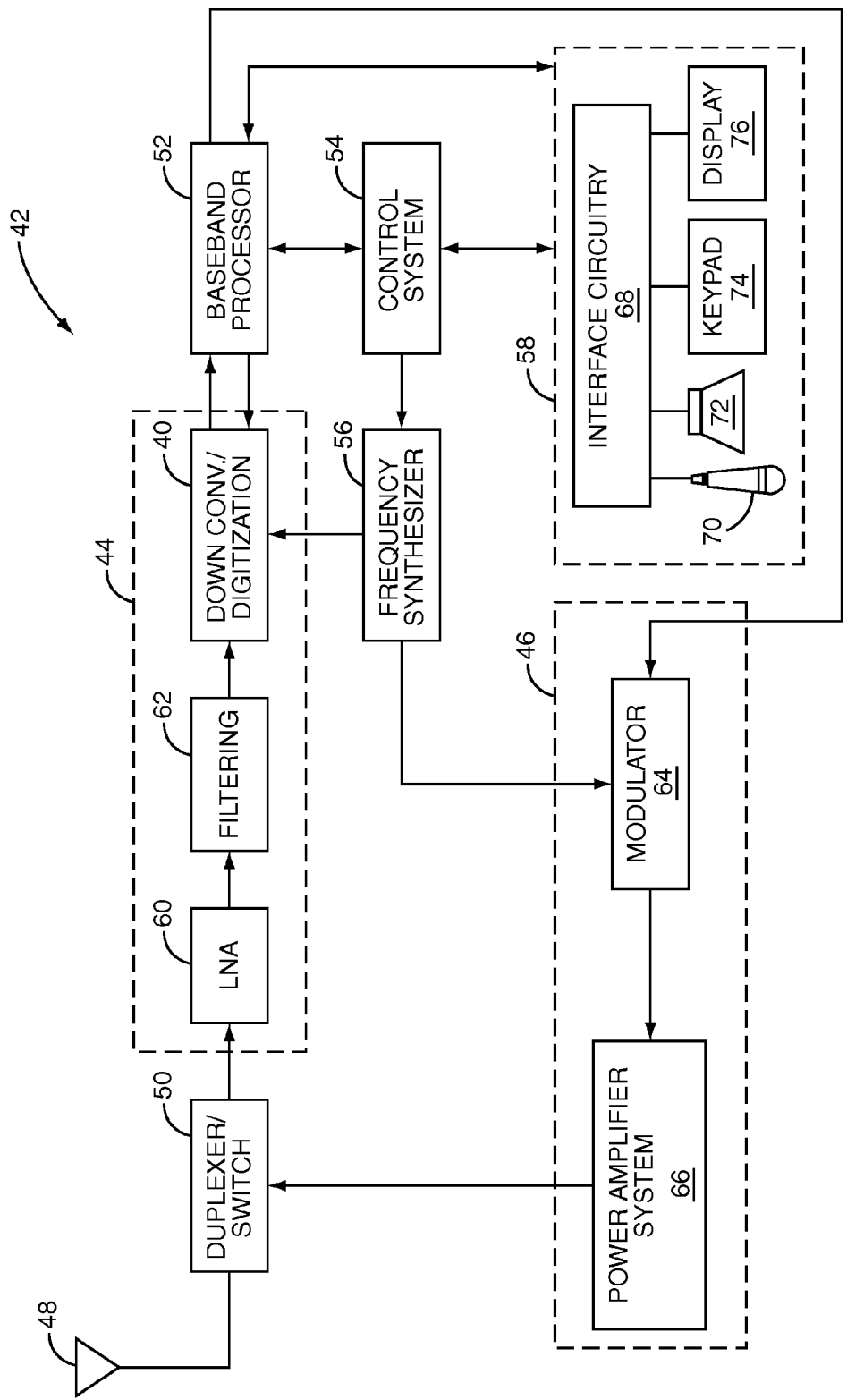
FIG. 6 shows an application example of the present invention used in a mobile terminal.

An application example of a quadrature RF VLIF receiver is its use in down conversion and digitization circuitry 40 in a mobile terminal 42, the basic architecture of which is represented in FIG. 6. The mobile terminal 42 may include a receiver front end 44, a radio frequency transmitter section 46, an antenna 48, a duplexer or switch 50, a baseband processor 52, a control system 54, a frequency synthesizer 56, and an interface 58. The receiver front end 44 receives information bearing radio frequency signals from one or more remote transmitters provided by a base station. A low noise amplifier (LNA) 60 amplifies the signal. A filter circuit 62 minimizes broadband interference in the received signal, while the down conversion and digitization circuitry 40 downconverts the filtered, received signal to an intermediate or baseband frequency signal, which is then digitized into one or more digital streams. The baseband processor 52 provides mode and channel information to the down conversion and digitization circuitry 40. The receiver front end 44 typically uses one or more mixing frequencies generated by the frequency synthesizer 56. The baseband processor 52 processes the digitized received signal to extract the information or data bits conveyed in the received signal. This processing typically comprises demodulation, decoding, and error correction operations. As such, the baseband processor 52 is generally implemented in one or more digital signal processors (DSPs).

On the transmit side, the baseband processor 52 receives digitized data, which may represent voice, data, or control information, from the control system 54, which it encodes for transmission. The encoded data is output to the transmitter 46, where it is used by a modulator 64 to modulate a carrier signal that is at a desired transmit frequency. A power amplifier system 66 amplifies the modulated carrier signal to a level appropriate for transmission, and delivers the amplified and modulated carrier signal to the antenna 48 through the duplexer or switch 50.

A user may interact with the mobile terminal 42 via the interface 58, which may include interface circuitry 68 associated with a microphone 70, a speaker 72, a keypad 74, and a display 76. The interface circuitry 68 typically includes analog-to-digital converters, digital-to-analog converters, amplifiers, and the like. Additionally, it may include a voice encoder/decoder, in which case it may communicate directly with the baseband processor 52. The microphone 70 will typically convert audio input, such as the user's voice, into an electrical signal, which is then digitized and passed directly or indirectly to the baseband processor 52. Audio information encoded in the received signal is recovered by the baseband processor 52, and converted by the interface circuitry 68 into an analog signal suitable for driving the speaker 72. The keypad 74 and display 76 enable the user to interact with the mobile terminal 42, input numbers to be dialed, address book information, or the like, as well as monitor call progress information.

Those skilled in the art will recognize improvements and modifications to the preferred embodiments of the present invention. All such improvements and modifications are considered within the scope of the concepts disclosed herein and the claims that follow.

What is claimed is:

1. A radio frequency (RF) receiver comprising:
    RF mixer circuitry adapted to:
        receive an RF input signal;
        receive a frequency select signal; and
        provide a down converted output signal based on mixing the RF input signal with a local oscillator signal having a local oscillator frequency, which is a function of the frequency select signal; and
    control circuitry adapted to:
        receive an RF signal strength signal based on a signal strength of the RF input signal, wherein the RF signal strength signal is different from the RF input signal; and
        generate the frequency select signal based on the RF signal strength signal to cause the RF mixer circuitry to down convert the RF input signal to a very low intermediate frequency (VLIF) signal.

2. The RF receiver of claim 1 wherein the RF mixer circuitry further comprises:
    a single in-phase mixer adapted to provide an in-phase down converted output signal; and
    a single quadrature-phase mixer adapted to provide a quadrature-phase down converted output signal.

3. The RF receiver of claim 2 wherein:
    the single in-phase mixer is further adapted to receive an in-phase local oscillator signal; and
    the single quadrature-phase mixer is further adapted to receive a quadrature-phase local oscillator signal,
    wherein the in-phase local oscillator signal and the quadrature-phase local oscillator signal are approximately equal in amplitude and phase-shifted approximately 90 degrees from each other.

4. The RF receiver of claim 2 further comprising a quadrature filter circuit adapted to:
    receive the in-phase down converted output signal;
    filter the in-phase down converted output signal to remove unwanted signals to create a filtered in-phase down converted output signal;
    receive the quadrature-phase down converted output signal; and
    filter the quadrature-phase down converted output signal to remove unwanted signals to create a filtered quadrature-phase down converted output signal.

5. The RF receiver of claim 2 further comprising a quadrature gain correction circuit adapted to:
    receive the in-phase down converted output signal;
    receive the quadrature-phase down converted output signal;
    apply an amplitude adjustment to the in-phase down converted output signal to create a corrected in-phase down converted output signal; and
    apply an amplitude adjustment to the quadrature-phase down converted output signal to create a corrected quadrature-phase down converted output signal,
    wherein the corrected quadrature-phase down converted output signal and the corrected in-phase down converted output signal are approximately equal in amplitude.

6. The RF receiver of claim 2 further comprising a quadrature gain correction circuit adapted to apply an amplitude adjustment such that the quadrature-phase down converted output signal and the in-phase down converted output signal are approximately equal in amplitude.

7. The RF receiver of claim 2 further comprising a quadrature phase correction circuit adapted to:
  receive the in-phase down converted output signal;
  receive the quadrature-phase down converted output signal;
  apply a phase adjustment to the in-phase down converted output signal to create a corrected in-phase down converted output signal; and
  apply a phase adjustment to the quadrature-phase down converted output signal to create a corrected quadrature-phase down converted output signal,
wherein the corrected quadrature-phase down converted output signal and the corrected in-phase down converted output signal are phase-shifted approximately 90 degrees from each other.

8. The RF receiver of claim 2 further comprising a quadrature phase correction circuit adapted to apply a phase adjustment such that the quadrature-phase down converted output signal and the in-phase down converted output signal are phase-shifted approximately 90 degrees from each other.

9. The RF receiver of claim 2 further comprising a quadrature analog-to-digital conversion circuit adapted to:
  receive the in-phase down converted output signal;
  convert the in-phase down converted output signal from an analog signal into a digital signal to create a digital in-phase down converted output signal;
  receive the quadrature-phase down converted output signal; and
  convert the quadrature-phase down converted output signal from an analog signal into a digital signal to create a digital quadrature-phase down converted output signal.

10. The RF receiver of claim 2 further comprising:
a quadrature filter circuit adapted to:
  receive the in-phase down converted output signal;
  filter the in-phase down converted output signal to remove unwanted signals to create a filtered in-phase down converted output signal;
  receive the quadrature-phase down converted output signal; and
  filter the quadrature-phase down converted output signal to remove unwanted signals to create a filtered quadrature-phase down converted output signal; and
a quadrature analog-to-digital conversion circuit adapted to:
  receive the filtered in-phase down converted output signal;
  convert the filtered in-phase down converted output signal from an analog signal into a digital signal to create a digital in-phase down converted output signal;
  receive the filtered quadrature-phase down converted output signal; and
  convert the filtered quadrature-phase down converted output signal from an analog signal into a digital signal to create a digital quadrature-phase down converted output signal.

11. The RF receiver of claim 1 wherein the down converted output signal further comprises a desired VLIF frequency, wherein the desired VLIF frequency is inversely related to a magnitude of the RF signal strength signal.

12. The RF receiver of claim 1 wherein the down converted output signal further comprises a desired VLIF frequency, wherein the desired VLIF frequency is one of a plurality of frequencies.

13. The RF receiver of claim 1 wherein the down converted output signal further comprises a desired VLIF frequency, wherein the desired VLIF frequency is a first VLIF frequency if the RF signal strength signal is greater than or equal to a threshold signal strength, and the desired VLIF frequency is a second VLIF frequency if the RF signal strength signal is less than the threshold signal strength.

14. The RF receiver of claim 13 wherein the first VLIF frequency is approximately 120 kilohertz, the second VLIF frequency is approximately 175 kilohertz, and the threshold signal strength is approximately −93 decibel milliwatt (dbm).

15. A method comprising:
  receiving a radio frequency (RF) input signal;
  receiving a frequency select signal;
  providing a down converted output signal based on mixing the RF input signal with a local oscillator signal having a local oscillator frequency, which is a function of the frequency select signal;
  receiving an RF signal strength signal based on a signal strength of the RF input signal, wherein the RF signal strength signal is different from the RF input signal; and
  generating the frequency select signal based on the RF signal strength signal to cause down conversion of the RF input signal to a very low intermediate frequency (VLIF) signal.

16. The method of claim 15 wherein the down converted output signal further comprises an in-phase down converted output signal and a quadrature-phase down converted output signal.

17. The method of claim 16 further comprising:
  receiving the in-phase down converted output signal;
  filtering the in-phase down converted output signal to remove unwanted signals to create a filtered in-phase down converted output signal;
  receiving the quadrature-phase down converted output signal; and
  filtering the quadrature-phase down converted output signal to remove unwanted signals to create a filtered quadrature-phase down converted output signal.

18. The method of claim 16 further comprising:
  receiving the in-phase down converted output signal;
  receiving the quadrature-phase down converted output signal;
  applying an amplitude adjustment and a phase adjustment to the in-phase down converted output signal to create a corrected in-phase down converted output signal; and
  applying an amplitude adjustment and a phase adjustment to the quadrature-phase down converted output signal to create a corrected quadrature-phase down converted output signal,
wherein the corrected quadrature-phase down converted output signal and the corrected in-phase down converted output signal are approximately equal in amplitude and phase-shifted approximately 90 degrees from each other.

19. The method of claim 16 further comprising:
  receiving the in-phase down converted output signal;
  converting the in-phase down converted output signal from an analog signal into a digital signal to create a digital in-phase down converted output signal;
  receiving the quadrature-phase down converted output signal; and
  converting the quadrature-phase down converted output signal from an analog signal into a digital signal to create a digital quadrature-phase down converted output signal.

20. The method of claim 15 wherein the down converted output signal further comprises a desired VLIF frequency, wherein the desired VLIF frequency is inversely related to a magnitude of the RF signal strength signal.

* * * * *